C. L. JOHNSON.
WHEEL HUB.
APPLICATION FILED JUNE 4, 1908.
959,015.
Patented May 24, 1910.
3 SHEETS—SHEET 1.
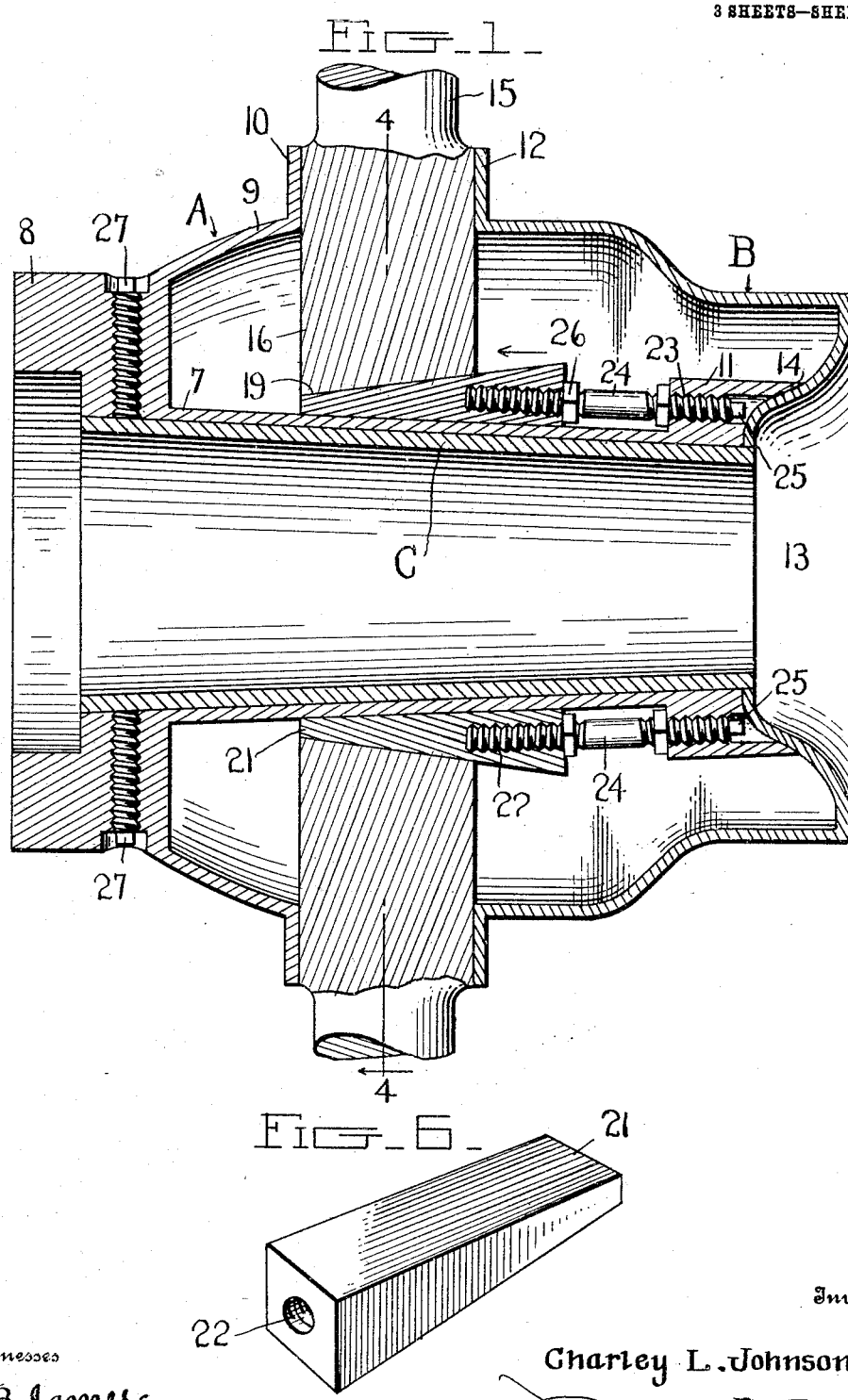

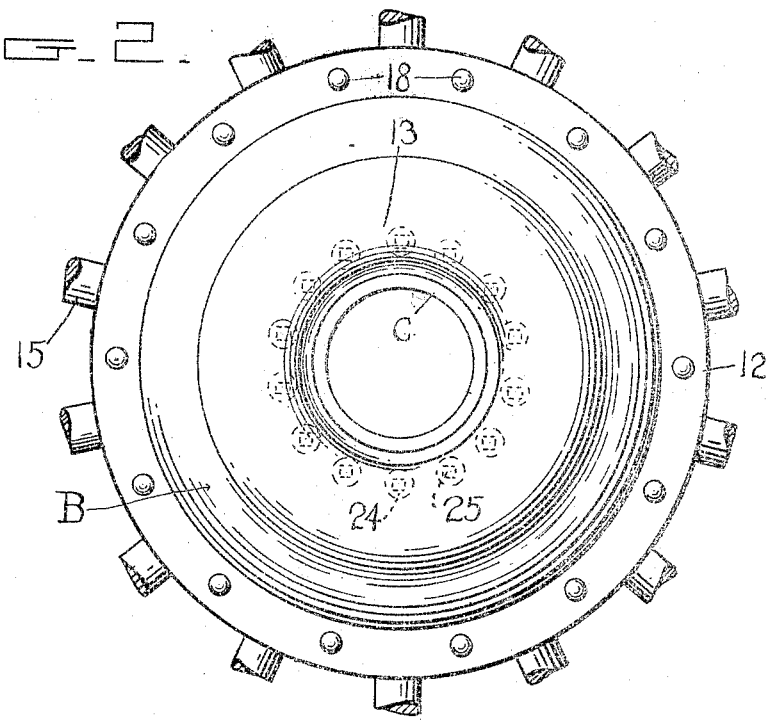
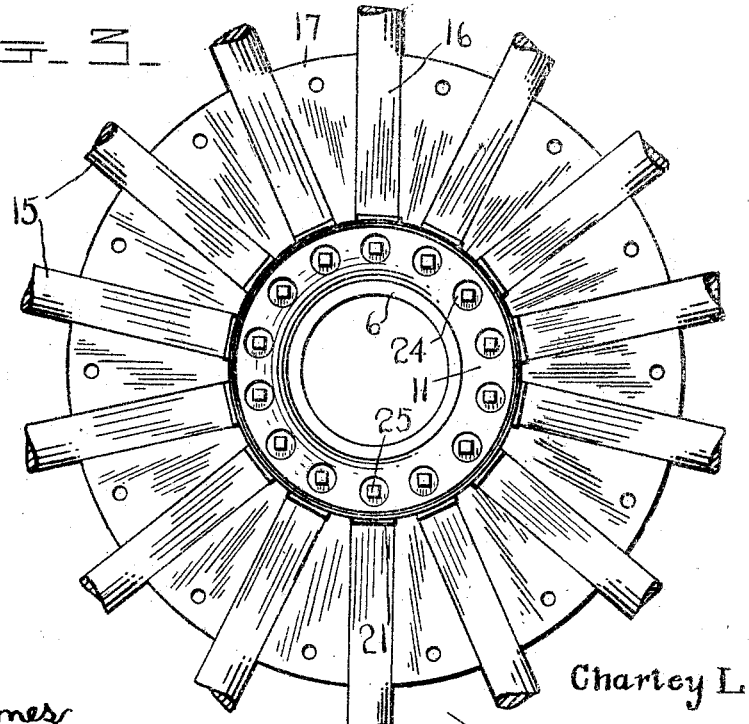

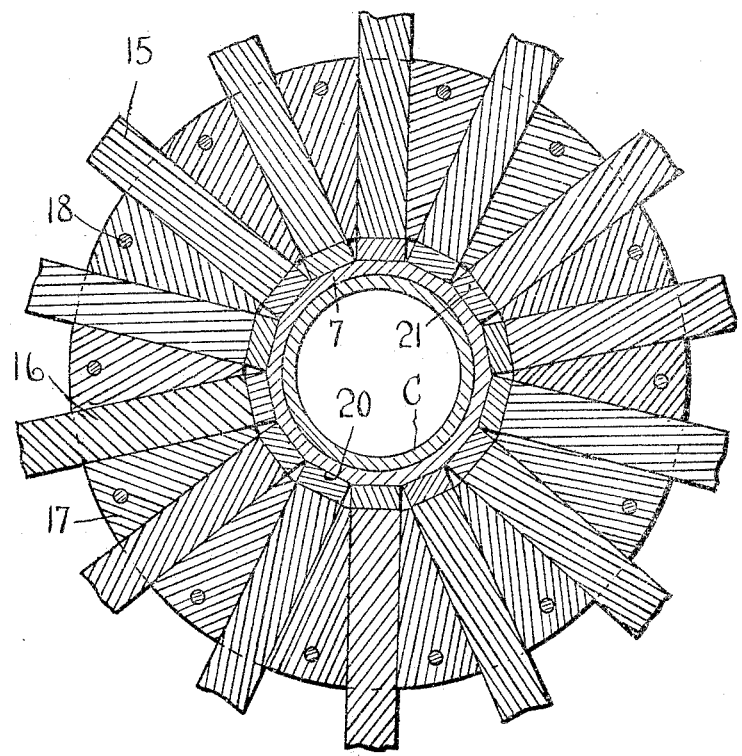
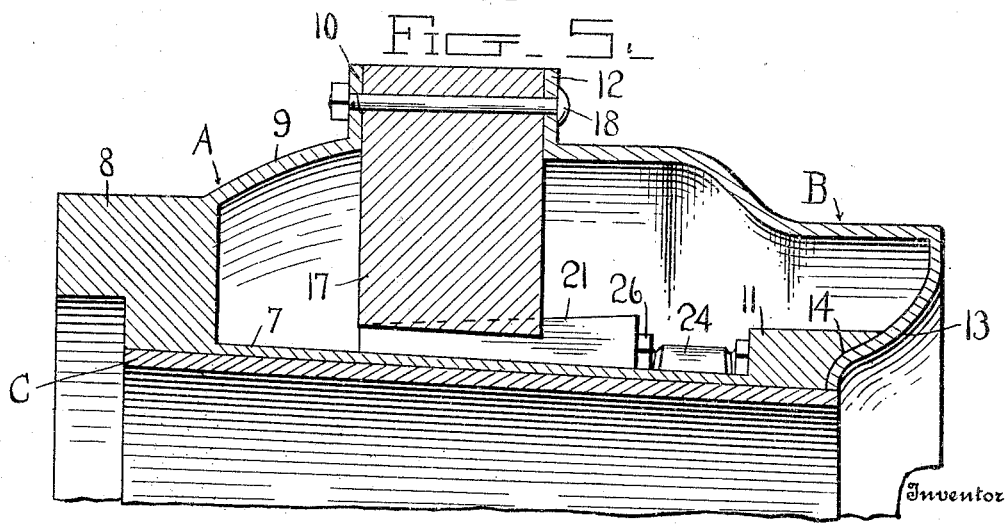

UNITED STATES PATENT OFFICE.

CHARLEY L. JOHNSON, OF LONGVILLE, LOUISIANA.

WHEEL-HUB.

959,015.  Specification of Letters Patent.  Patented May 24, 1910.

Application filed June 4, 1908. Serial No. 436,737.

*To all whom it may concern:*

Be it known that I, CHARLEY L. JOHNSON, a citizen of the United States, residing at Longville, in the parish of Calcasieu, State of Louisiana, have invented certain new and useful Improvements in Wheel-Hubs; and I do hereby declare the following to be a full, clear, and exact description of the invention, such as will enable others skilled in the art to which it appertains to make and use the same.

This invention relates to vehicle wheel hubs and has for its object to provide a hub of such construction that the spokes associated therewith may be readily removed and replaced when necessary or may be adjusted radially to set or tighten the tire of the wheel in connection with which the hub is used.

The means for adjusting the spokes radially is concealed under normal conditions by a removable section of the hub and this means is of such character that any adjustment made thereby will be permanent.

In the accompanying drawings, Figure 1 is a vertical longitudinal sectional view through the hub, Fig. 2 is an end elevation of the hub, Fig. 3 is a similar view with the removable section of the hub detached, Fig. 4 is a vertical sectional view taken in a plane at right angles to the axis of the hub, Fig. 5 is a fragmentary view similar to Fig. 1 but taken in a plane through one of the spacing blocks for the butt ends of the spokes, and, Fig. 6 is a detail perspective view of one of the wedges for adjusting the spokes radially.

As shown in the drawings, the hub embodied in my invention comprises two sections one of which is indicated in general by the reference character A and the other by the reference character B, these two sections being connected in a manner which will presently be made clear and being engaged upon the usual spindle thimble C.

The section A comprises a sleeve portion 7 formed integral with an annular body 8 the body being located at one end of the sleeve portion and the said sleeve portion being extended from one side face of the said body at the inner periphery thereof. A curved annular flange 9 is formed integral with the said side face of the body at the outer periphery thereof and surrounds the inner portion of the sleeve 7 this flange 9 being formed with a radial flange 10, the function of which will presently be made apparent. The sleeve portion 7 fits upon the thimble sleeve and corresponds substantially in length to said thimble and formed integral with the outer end of the said sleeve portion is an annular body portion 11.

The section B of the hub is in the form of a cap having substantially the same exterior outline as the section A including a radial flange 12 which corresponds to the flange 10 of the said section A. At its outer end, the section B is formed with an annular inturned flange 13 which, when the sections are placed together, fits against the outer edge face of the body portion 11, the body portion being formed as at 14 to receive the said flange.

The spokes, associated with the hub, are indicated in general by the numeral 15 and are inserted with their butt ends 16 between the opposing ends or faces of the sections A and B or in other words between the flanges 10 and 12 there being spacing blocks 17 inserted one between each pair of spokes or rather between the butt ends thereof and between the flanges 10 and 12 and bolts 18 which are engaged through the said flanges 10 and 12 and through the spacing blocks, which blocks are of wedge shape.

The inner or butt ends of the spokes 15 are beveled as at 19 and the opposing surface or face of the sleeve portion 7 is of polygonal outline as indicated at 20 each face of the said portion being presented toward the beveled end face of one of the spokes. A wedge block 21 is inserted between each of the said faces 20 of the sleeve 7 and the inner beveled end of the corresponding one of the spokes and these wedge blocks are formed each with a threaded bore 22 which opens through its major end. A number of threaded bores or openings 23 are formed through the body portion 11 of the member A and threaded through these latter bores and into the bores 22 in the wedges 21 are adjusting screws 24 formed at their outer ends each with a squared head 25 with which a socket wrench may be engaged to manipulate the screw and adjust the wedge, it being understood that by turning the screws in such a manner as to force the wedges in the direction indicated by the arrow in Fig. 1, the spokes 15 will be forced radially in a direction from the hub and the tire will be in this manner tightened or set. In order that the adjustment thus obtained may be rendered permanent until further adjustment is necessary, if at all, jam nuts 26 are threaded upon each of the adjusting screws 24 one of the nuts bearing against the butt end face of the corresponding wedge and the other against the inner face of the body portion 11.

In order to adjust the spokes as heretofore stated, the section B is removed from the hub, the adjusting screws 24 turned to the proper degree, the jam nuts 26 tightened, and the section B replaced, it being understood that when so replaced, the squared ends 25 of the adjusting screws are concealed as well as are the wedges and the screws themselves.

In order that the wheel may be trued with respect to the axle, set screws 27 are threaded through the body portion 8 of the section A and bear against the thimble C it being understood that these screws may be adjusted for the purpose stated.

What is claimed is:—

A wheel hub comprising a main section and a cap section, spokes fitted between the sections, the main section including a sleeve extending beneath the butt ends of said spokes into said cap section, a collar formed on the outer end of said sleeve portion, said collar being provided with a series of openings formed therethrough, each of said openings including a threaded portion, a series of wedges each locted between the butt end of a respective spoke and said sleeve portion, each of said wedges being provided with a threaded recess, the threads in the collar and in the recess being of opposite hand, screws held in the recesses of the wedges and the openings through the collar, the ends of said screws being threaded in opposite directions, lock nuts held on each of said screws and adapted to engage against the collar and the end of the wedge to which the respective screw pertains, and a key receiving end formed on the outer portion of each of said screws.

In testimony whereof, I affix my signature, in presence of two witnesses.

CHARLEY L. JOHNSON.

Witnesses:
T. L. GRIFFIN,
W. F. GOODWILL.